(12) United States Patent
Park

(10) Patent No.: US 7,782,742 B2
(45) Date of Patent: Aug. 24, 2010

(54) RECORDING MEDIUM WITH PHYSICAL ACCESS CONTROL (PAC) INFORMATION THEREON AND APPARATUS AND METHODS FOR FORMING, RECORDING, AND REPRODUCING THE RECORDING MEDIUM

(75) Inventor: Yong Cheol Park, Gwachon-si (KR)

(73) Assignee: LG Electronics, Inc., Seoul (KR)

( * ) Notice: Subject to any disclaimer, the term of this patent is extended or adjusted under 35 U.S.C. 154(b) by 911 days.

(21) Appl. No.: 11/061,667

(22) Filed: Feb. 22, 2005

(65) Prior Publication Data

US 2005/0207320 A1    Sep. 22, 2005

Related U.S. Application Data

(60) Provisional application No. 60/554,356, filed on Mar. 19, 2004.

(30) Foreign Application Priority Data

May 31, 2004    (KR) ...................... 10-2004-0039142

(51) Int. Cl.
G11B 7/24    (2006.01)
(52) U.S. Cl. .................................. 369/275.1
(58) Field of Classification Search ............. 369/47.14, 369/53.16, 59.25, 124.07
See application file for complete search history.

(56) References Cited

U.S. PATENT DOCUMENTS

| | | | |
|---|---|---|---|
| 5,237,553 A | | 8/1993 | Fukushima et al. |
| 5,315,447 A | * | 5/1994 | Nakayama et al. ............ 360/49 |
| 5,386,402 A | | 1/1995 | Iwata |
| 5,448,728 A | | 9/1995 | Takano et al. |
| 5,552,776 A | | 9/1996 | Wade et al. |
| 5,815,485 A | | 9/1998 | Tanaka et al. |
| 6,115,346 A | | 9/2000 | Sims, III |
| 6,223,303 B1 | | 4/2001 | Billings et al. |
| 6,330,210 B1 | * | 12/2001 | Weirauch et al. ......... 369/30.11 |
| 6,351,788 B1 | | 2/2002 | Yamazaki et al. |
| 6,526,522 B1 | | 2/2003 | Park et al. |
| 6,580,684 B2 | * | 6/2003 | Miyake et al. ........... 369/275.3 |
| 6,621,783 B1 | | 9/2003 | Murata |
| 6,691,209 B1 | | 2/2004 | O'Connell |

(Continued)

FOREIGN PATENT DOCUMENTS

CA    2 494 148    8/2003

(Continued)

OTHER PUBLICATIONS

International Search Report dated Jun. 15, 2005, for PCT/KR 2004/003515.

(Continued)

*Primary Examiner*—Daniell L Negrón
*Assistant Examiner*—Henok G Heyi
(74) *Attorney, Agent, or Firm*—Harness, Dickey & Pierce, P.L.C.

(57) ABSTRACT

A recording medium, such as a high-density and/or optical recording medium including physical access control (PAC) information recorded thereon, and apparatus and methods for recording to and reproducing from the recording medium, in order to improve data protection, data management and/or reproduction compatibility.

34 Claims, 16 Drawing Sheets

U.S. PATENT DOCUMENTS

| | | |
|---|---|---|
| 6,725,200 B1 | 4/2004 | Rost |
| 6,765,853 B1 | 7/2004 | Ko et al. |
| 6,785,839 B2 | 8/2004 | Ko et al. |
| 6,912,188 B2 | 6/2005 | Morishima |
| 6,963,523 B1 | 11/2005 | Park |
| 7,133,333 B2 | 11/2006 | Ko |
| 7,219,202 B2 | 5/2007 | Satoyama et al. |
| 7,230,893 B2 | 6/2007 | Park |
| 7,480,764 B2 | 1/2009 | Park |
| 7,680,022 B2 | 3/2010 | Park |
| 2001/0018727 A1 | 8/2001 | Ando et al. |
| 2001/0034856 A1 | 10/2001 | Ko et al. |
| 2002/0036643 A1 | 3/2002 | Namizuka et al. |
| 2002/0078295 A1 | 6/2002 | Shaath et al. |
| 2002/0136118 A1 | 9/2002 | Takahashi |
| 2002/0136134 A1 | 9/2002 | Ito et al. |
| 2003/0035355 A1 | 2/2003 | Morishima |
| 2003/0048731 A1 | 3/2003 | Ozaki |
| 2003/0137910 A1 | 7/2003 | Ueda et al. |
| 2003/0137915 A1 | 7/2003 | Shoji et al. |
| 2003/0169660 A1 | 9/2003 | Shirai et al. |
| 2003/0185130 A1 | 10/2003 | Kamperman et al. |
| 2003/0210627 A1* | 11/2003 | Ijtsma et al. ............. 369/53.18 |
| 2003/0212564 A1* | 11/2003 | Sawabe et al. ............. 704/500 |
| 2004/0013061 A1 | 1/2004 | Wu |
| 2004/0017482 A1 | 1/2004 | Weitman |
| 2004/0174782 A1 | 9/2004 | Lee et al. |
| 2004/0174793 A1* | 9/2004 | Park et al. ............. 369/59.25 |
| 2004/0193946 A1* | 9/2004 | Park et al. ............. 714/6 |
| 2004/0218488 A1 | 11/2004 | Hwang et al. |
| 2004/0228238 A1* | 11/2004 | Ko et al. ............. 369/47.13 |
| 2004/0246852 A1 | 12/2004 | Hwang et al. |
| 2005/0083740 A1 | 4/2005 | Kobayashi |
| 2005/0111315 A1* | 5/2005 | Hwang et al. ............. 369/47.14 |
| 2005/0169132 A1 | 8/2005 | Kuraoka et al. |
| 2005/0195716 A1* | 9/2005 | Ko et al. ............. 369/53.16 |
| 2005/0207294 A1 | 9/2005 | Park |
| 2005/0207318 A1 | 9/2005 | Park |
| 2005/0207320 A1 | 9/2005 | Park |
| 2005/0259560 A1 | 11/2005 | Park |
| 2006/0184727 A1 | 8/2006 | Sasaki et al. |
| 2006/0221689 A1* | 10/2006 | Yoshida et al. ......... 365/185.09 |
| 2007/0053267 A1 | 3/2007 | Brondijk |
| 2007/0211589 A1 | 9/2007 | Park |
| 2007/0211590 A1 | 9/2007 | Park |

FOREIGN PATENT DOCUMENTS

| | | |
|---|---|---|
| CN | 1192818 | 9/1998 |
| CN | 1441430 | 9/2003 |
| EP | 0 495 471 A2 | 7/1992 |
| EP | 0997904 | 5/2000 |
| EP | 1 161 517 A1 | 12/2000 |
| EP | 1 251 508 A2 | 10/2002 |
| EP | 1 306 840 | 5/2003 |
| EP | 1 329 888 A1 | 7/2003 |
| EP | 1 381 047 A1 | 1/2004 |
| EP | 1505597 | 2/2005 |
| EP | 1587102 | 10/2005 |
| EP | 1 887 577 A2 | 2/2008 |
| JP | 6-259886 | 9/1994 |
| JP | 07-29177 | 1/1995 |
| JP | 07-121993 | 5/1995 |
| JP | 07-200182 | 8/1995 |
| JP | 09-213011 | 8/1997 |
| JP | 10-092149 | 4/1998 |
| JP | 11-039801 | 2/1999 |
| JP | 11-066751 | 3/1999 |
| JP | 2000-195178 | 7/2000 |
| JP | 2000-285029 | 10/2000 |
| JP | 2000-322835 | 11/2000 |
| JP | 2000-322841 | 11/2000 |
| JP | 2001-126407 | 5/2001 |
| JP | 2001-351334 | 12/2001 |
| JP | 2002-015525 | 1/2002 |
| JP | 2002-092873 | 3/2002 |
| JP | 2002-124037 | 4/2002 |
| JP | 2002-175668 | 6/2002 |
| JP | 2002-278821 | 9/2002 |
| JP | 2002-288593 | 10/2002 |
| JP | 2002-328848 | 11/2002 |
| JP | 2003-059063 | 2/2003 |
| JP | 2003-208779 | 7/2003 |
| JP | 2003-228835 | 8/2003 |
| JP | 2003-242650 | 8/2003 |
| JP | 2003-323769 | 11/2003 |
| JP | 2003-346426 | 12/2003 |
| JP | 2004-005842 | 1/2004 |
| JP | 2004-030779 | 1/2004 |
| JP | 2006-313628 | 11/2006 |
| JP | 2007-529843 | 10/2007 |
| JP | 2008-052289 | 3/2008 |
| MX | PA05001548 A | 5/2005 |
| RU | 2208844 | 7/2003 |
| RU | 2225043 | 2/2004 |
| RU | 2269829 | 2/2006 |
| RU | 2 299 481 | 5/2007 |
| WO | WO 00/45386 | 8/2000 |
| WO | WO 01/01416 A1 | 1/2001 |
| WO | WO 01/18731 A1 | 3/2001 |
| WO | WO 02/052556 | 7/2002 |
| WO | WO 02/067093 | 8/2002 |
| WO | 03/030173 | 4/2003 |
| WO | WO 03/102936 A1 | 12/2003 |
| WO | WO 03/105150 | 12/2003 |
| WO | WO 04/001753 A1 | 12/2003 |
| WO | WO 04/001754 A1 | 12/2003 |
| WO | WO 2004/015708 | 2/2004 |
| WO | WO 2004/019326 A1 | 3/2004 |
| WO | WO 2004/025649 | 3/2004 |
| WO | WO 2004/036561 | 4/2004 |
| WO | WO 2004/079730 A1 | 9/2004 |
| WO | WO 2004/081936 A1 | 9/2004 |
| WO | WO 2004/100159 A1 | 11/2004 |
| WO | WO 2005/004154 A2 | 1/2005 |
| WO | 2005/086598 | 9/2005 |
| WO | WO 2005/088636 A1 | 9/2005 |

OTHER PUBLICATIONS

Office Action issued Dec. 12, 2008 by the U.S. Patent and Trademark Office in related U.S. Appl. No. 11/907,660.

Search report issued Aug. 4, 2008 by the European Patent Office in counterpart European Patent Application No. 07110264.4-2223.

Search report issued Jul. 30, 2008 by the European Patent Office in counterpart European Patent Application No. 07150328.8-2223.

Office Action issued Sep. 12, 2008 by the USPTO in counterpart U.S. Appl. No. 11/155,485.

Office Action issued Sep. 3, 2008 by the USPTO in counterpart U.S. Appl. No. 11/085,134.

English language translation of Office Action issued Mar. 30, 2009 by the Russian Patent Office in counterpart Russian Patent Application No. 2006136920.

Office Action issued Jan. 15, 2009 by the Russian Patent Office in Counterpart Russian Patent Application No. 2006136909 (with English language translation).

Office Action dated May 22, 2009 by the Malaysian Patent Office in counterpart Malaysian Patent Application No. PI 20045424.

Office Action issued Jun. 11, 2009 by the USPTO in counterpart U.S. Appl. No. 11/061,891.

"120 mm DVD Rewritable Disk (DVD-RAM)", ECMA Standardizing Information and Communication Systems, Standard ECMA-272, $2^{nd}$ Edition, Jun. 1999.

Office Action issued Jun. 23, 2009 by the Australian Patent Office in counterpart Australian Patent Application No. 2004317315.

Notice of Allowance for Russian patent application No. 2006136909/28 dated Aug. 20, 2009.

Japanese Office Action dated Oct. 16, 2009 for Japanese Patent Application No. 2007-238481.

Japanese Office Action dated Oct. 16, 2009 for Japanese Patent Application No. 2007-503819.

Japanese Office Action dated Nov. 6, 2009 for corresponding Application No. 2007-503814.

Chinese Office Action dated Oct. 23, 2009 for corresponding Application No. 200710138431.4.

Russian Notice of Allowance dated Oct. 25, 2009 for corresponding Application No. 2006136920.

Russian Notice of Allowance dated Oct. 26, 2009 for corresponding Application No. 2006136914.

USPTO Office Action dated Dec. 8, 2009 for corresponding U.S. Appl. No. 11/061,891.

European Patent Office Action dated May 14, 2008, for European Patent Application No. 04808643.3-2223.

European Patent Office Search Report dated May 15, 2008, for European Patent Application No. 07111355.9-2223.

Blu-Ray Disc Association, "Rewritable Blu-Ray Disc (BD-RE) Multi-Media Command Set Description, Version 0.80", [Online] Nov. 9, 2004.

Search Report issued May 23, 2008 by the European Patent Office in counterpart European Patent Application No. 07120363.2-2223.

Office Action for Japanese patent application No. 2007-503814 dated Jun. 4, 2010.

Office Action for Canadian patent application No. 2 559 578 dated May 26, 2010 (in English).

Office Action for Canadian patent application No. 2 559 575 dated May 27, 2010 (in English).

Office Action for Japanese patent application No. 2007-503822 dated Jun. 4, 2010.

* cited by examiner

|  |  | BD-RE | BD-R | BD-ROM |
|---|---|---|---|---|
| INFO2 | Reserved | 128 | 128 | 160 |
|  | PAC 2 | 32 | 32 | 32 |
|  | DMA2 | 32 | 32 |  |
|  | CD2 | 32 | 32 | 32 |
|  | BZ3 | 32 | 32 | 32 |
|  |  |  |  |  |
| INFO1 | BZ2 | 32 | 32 | 192 |
|  | Drive Area | 32 | 128 |  |
|  | Reserved | 96 |  |  |
|  | DMA1 | 32 | 32 |  |
|  | CD1 | 32 | 32 | 32 |
|  | BZ1-PAC I | 32 | 32 | 32 |

FIG. 4

| | Sector in each PAC | Data Byte Position | Description |
|---|---|---|---|
| Common Header for all PACs | 0 | $D_0$ to $D_3$ | PAC_ID |
| | 0 | $D_4$ to $D_7$ | Reserved |
| | 0 | $D_8$ to $D_{11}$ | Unknown PAC Rules |
| | 0 | $D_{12}$ to $D_{13}$ | Reserved |
| | 0 | $D_{14}$ | Entire Disc Flag |
| | 0 | $D_{15}$ | Number of Segments |
| | 0 | $D_{16}$ to $D_{23}$ | Segment_0 |
| | 0 | $D_{24}$ to $D_{31}$ | Segment_1 |
| | 0 | ... | ... |
| | 0 | $D_{264}$ to $D_{271}$ | Segment_31 |
| | 0 | $D_{272}$ to $D_{383}$ | Reserved(not used) |
| | 0 | $D_{384}$ to $D_{2047}$ | Reserved for Specific PAC |
| PAC specific information | 1 to 31 | $D_0$ to $D_{2047}$ | Reserved for Specific PAC |

FIG. 5

| Area | Control | | Number of bits |
|---|---|---|---|
| | Read | Write | |
| PAC zones 1,2 | Yes | Yes | 2 · 10 |
| Individual PACs | Yes | Yes | 2 |
| Control Data zones 1,2 | Yes | Yes | 2 |
| DMA zones 1,2 | No | Yes | 1 |
| Replacement clusters | No | Yes | 1 |
| Data Zone | Yes | Yes | 2 |
| Logical Overwrite | No | Yes | 1 |
| Reserved Area | Yes | Yes | 2 · 10 |
| Buffer zone 3 | Yes | Yes | 2 · 0 |
| Buffer zone 2 | Yes | Yes | 2 · 0 |
| Drive Area | No | No | 0 |
| Reserved Area | Yes | Yes | 2 · 6 |
| Buffer Zone 1 | Yes | Yes | 2 · 0 |
| Reserved for future areas | | | 11 · 6 |

<PAC Zone>

User Data Area

FIG. 9

| Contents | Number of bytes |
|---|---|
| DDS identifier = "DS" | 2 |
| DDS format = 00h | 1 |
| ⋮ | |
| First PSN of Drive Area(P_DA) | 4 |
| First PSN of Defect List(P_DFL) | 4 |
| Location of LSN 0 of User Data Area | 4 |
| Inner Spare Area 0 size(ISA0_size) | 4 |
| Out Spare Area size(OSA_size) | 4 |
| Inner Spare Area 1 size(ISA1_size) | 4 |
| PAC Clusters Defect Status | 2 |
| PAC Allocated space | 2 |
| ⋮ | |

FIG. 10

| | Bit7 | Bit6 | Bit5 | Bit4 | Bit3 | Bit2 | Bit1 | Bit0 |
|---|---|---|---|---|---|---|---|---|
| PAC Clusters Defect Status Bitmap | PDS7 | PDS6 | PDS5 | PDS4 | PDS3 | PDS2 | PDS1 | PDS0 |
| | PDS15 | PDS14 | PDS13 | PDS12 | PDS11 | PDS10 | PDS9 | PDS8 |
| PAC Allocated Space Bitmap | PSB7 | PSB6 | PSB5 | PSB4 | PSB3 | PSB2 | PSB1 | PSB0 |
| | PSB15 | PSB14 | PSB13 | PSB12 | PSB11 | PSB10 | PSB9 | PSB8 |

<Bitmap in DDS>

| PAC #0 |
|---|
| PAC #1 |
| PAC #2 |
| PAC #3 |
| PAC #4 |
| PAC #5 |
| PAC #6 |
| PAC #7 |
| PAC #8 |
| PAC #9 |
| PAC #10 |
| PAC #11 |
| PAC #12 |
| PAC #13 |
| PAC #14 |
| PAC #15 |

< PAC II in INFO 2 >

- PDS bit : Show the status of the PAC clusters $\begin{pmatrix} 0b : \text{To indicate that the PAC cluster N is non-defective} \\ 1b : \text{To indicate that the PAC cluster N is defective} \end{pmatrix}$

- PSB bit : Show the allocation status of the PAC clusters $\begin{pmatrix} 0b : \text{To indicate that the PAC clusters N is newly allocatable} \\ 1b : \text{To indicate that the PAC clusters N is allocated} \end{pmatrix}$

FIG. 14

| Contents | Number of bytes |
|---|---|
| DDS identifier = "DS" | 2 |
| DDS format = 00h | 1 |
| ⋮ | |
| First PSN of Drive Area(P_DA) | 4 |
| First PSN of Defect List(P_DFL) | 4 |
| Location of LSN 0 of User Data Area | 4 |
| Inner Spare Area 0 size(ISA_size) | 4 |
| Out Spare Area size(OSA_size) | 4 |
| Inner Spare Area 1 size(ISA1_size) | 4 |
| PAC Status | 8 |
| ⋮ | |

FIG. 15

| PAC status Bitmap | PAC II Zone | b47, b46 | b45, b44 | b43, b42 | b41, b40 | b39, b38 | b37, b36 | b35, b34 | b33, b32 |
|---|---|---|---|---|---|---|---|---|---|
| | | b63, b62 | b61, b60 | b59, b58 | b57, b56 | b55, b54 | b53, b52 | b51, b50 | b49, b48 |
| | PAC I Zone | b15, b14 | b13, b12 | b11, b10 | b9, b8 | b7, b6 | b5, b4 | b3, b2 | b1, b0 |
| | | b31, b30 | b29, b28 | b27, b26 | b25, b24 | b23, b22 | b21, b20 | b19, b18 | b17, b16 |

<PACII>

| PAC #0 |
| PAC #1 |
| PAC #2 |
| PAC #3 |
| PAC #4 |
| PAC #5 |
| PAC #6 |
| PAC #7 |
| PAC #8 |
| PAC #9 |
| PAC #10 |
| PAC #11 |
| PAC #12 |
| PAC #13 |
| PAC #14 |
| PAC #15 |

<PACI>

| PAC #0 |
| PAC #1 |
| PAC #2 |
| PAC #3 |
| PAC #4 |
| PAC #5 |
| PAC #6 |
| PAC #7 |
| PAC #8 |
| PAC #9 |
| PAC #10 |
| PAC #11 |
| PAC #12 |
| PAC #13 |
| PAC #14 |
| PAC #15 |

| bn+1, bn | Contents in PAC location |
|---|---|
| 00 | Unrecorded |
| 01 | 4byte PAC_ID is (00 00 00 00) or (FF FF FF FF) |
| 10 | 4 byte PAC_ID is (FF FF FF FE), indicates defective locations |
| 11 | Contains a valid PAC {e.g. valid PAC = (54 53 54 00)} |

FIG. 16

| PAC #0 | PAC #1 | PAC #2 | PAC #3 | PAC #4 | PAC #5 | PAC #6 | PAC #7 | PAC #8 | PAC #9 | PAC #10 | PAC #11 | PAC #12 | PAC #13 | PAC #14 | PAC #15 | <PACI> |
|---|---|---|---|---|---|---|---|---|---|---|---|---|---|---|---|---|
| PAC #0 | PAC #1 | PAC #2 | PAC #3 | PAC #4 | PAC #5 | PAC #6 | PAC #7 | PAC #8 | PAC #9 | PAC #10 | PAC #11 | PAC #12 | PAC #13 | PAC #14 | PAC #15 | <PACII> |

| PAC status Bitmap | | | | | | | | |
|---|---|---|---|---|---|---|---|---|
| | PAC II Zone | 00 | 00 | 00 | 00 | 01 | 10 | 11 |
| | | 00 | 00 | 00 | 00 | 00 | 00 | 00 |
| | PAC I Zone | 00 | 00 | 00 | 00 | 01 | 10 | 11 |
| | | 00 | 00 | 00 | 00 | 00 | 00 | 00 |

RECORDING MEDIUM WITH PHYSICAL ACCESS CONTROL (PAC) INFORMATION THEREON AND APPARATUS AND METHODS FOR FORMING, RECORDING, AND REPRODUCING THE RECORDING MEDIUM

CROSS-REFERENCE TO RELATED APPLICATIONS

This U.S. non-provisional application claims priority of U.S. provisional application Ser. No. 60/554,356 filed on Mar. 19, 2004 and Korean Application No. 10-2004-0039142, filed on May 31, 2004, in the Korean Intellectual Property Office, the entire contents of each of which are hereby incorporated by reference.

BACKGROUND OF THE INVENTION

1. Field of the Invention

The present invention relates to PAC (Physical Access Control), PAC zones, PAC clusters, media containing PAC zones and/or clusters (for example, high density optical discs, such as Blu-ray Disc) and apparatus and methods for recording and/or reproducing data to and/or from the media.

2. Discussion of the Related Art

Media, for example, optical discs may be used for recording a large quantity of data. Of the optical discs available, a new high density optical media (HD-DVD), for example, the Blu-ray Disc (hereafter called as "BD") is under development, which enables increased recording and/or storing of high definition video and/or audio data.

BD further includes a rewritable Blu-ray disc (BD-RE), Blu-ray disc writable once (BD-WO), and Blu-ray disc read only (BD-ROM).

Currently, one problem with existing systems is the potential incompatibility between drives of different versions, for example a drive of a previous version with a previous set of capabilities may have difficulty interacting with a medium that has interacted with a drive including at least one capability from a subsequent set of capabilities.

SUMMARY OF THE INVENTION

Example embodiments of the present invention provide a PAC on a medium, such as a high density optical disc, and apparatus and methods for recording data to and reproducing data from the medium using a PAC.

Example embodiments of the present invention provide physical access control (PAC) information recorded thereon, in order to improve data protection, improve data management, improve reproduction compatibility, avoid destruction of data, and/or reduce unnecessary, repetitive operations.

Example embodiments of the present invention provide a medium, such as a high density optical disc, and apparatus and methods for managing a PAC.

Example embodiments of the present invention provide a medium, such as a high density optical disc, and apparatus and methods which use a PAC for managing data.

In an example embodiment, the present invention is directed to a recording medium including at least one physical access control (PAC) zone further including at least one physical access control (PAC) cluster, the at least one PAC cluster including information for managing recording to and/or reproducing from the recording medium.

In an example embodiment, the present invention is directed to a method of recording on a recording medium including recording a physical access control (PAC) cluster, the PAC cluster including information for managing recording to and/or reproducing from the recording medium and recording status information for the PAC cluster, the status information including at least validity of the PAC cluster.

In an example embodiment, the present invention is directed to a method of reproducing from a recording medium including reading status information for at least one physical access control (PAC) cluster, the at least one PAC cluster including information for managing reproduction from the recording medium and reading the at least one PAC cluster based on the status information, the status information including at least validity of each PAC cluster.

In an example embodiment, the present invention is directed to an apparatus for recording to and/or reproducing from a recording medium including a driver for driving an optical recording device to record data on the recording medium or reproduce data from the recording medium and a controller for controlling the driver to record or reproduce the data based on at least one physical access control (PAC) zone, the at least one PAC zone including at least one physical access control (PAC) cluster, including information for managing recording to and/or reproducing from the recording medium, and status information for each PAC cluster, the status information indicating at least validity of each PAC cluster.

In an example embodiment, the present invention is directed to an apparatus for recording to and/or reproducing from a recording medium including a driver for driving an optical recording device to record data on the recording medium or reproduce data from the recording medium and a controller for controlling the driver to record or reproduce the data based on at least one physical access control (PAC) zone, the at least one PAC zone including at least one physical access control (PAC) cluster, said controller reading status information for at least one PAC cluster, the at least one PAC cluster including information for managing reproduction from the recording medium and said controller reading the at least one PAC cluster based on the status information, the status information including at least validity of each PAC cluster.

In an example embodiment, the present invention is directed to a recording medium including at least one physical access control (PAC) cluster including information for managing recording to and/or reproducing from the recording medium and status information for each PAC cluster, the status information indicates at least validity of each PAC cluster.

It is to be understood that both the foregoing general description and the following detailed description of embodiments of the present invention are examples and explanatory and are intended to provide further explanation of the invention as claimed.

BRIEF DESCRIPTION OF THE DRAWINGS

The accompanying drawings, which are included to provide a further understanding of example embodiments of the invention and are incorporated in and constitute a part of this application, illustrate example embodiment(s) of the invention where.

FIG. 4 illustrates a structure of a PAC on a high density optical disc in accordance with an example embodiment of the present invention;

FIG. 5 illustrates a configuration of an "Unknown PAC Rules" field in accordance with an example embodiment of the present invention;

FIG. 9 illustrates a Disc Definition Structure (DDS) on a high density optical disc in accordance with an example embodiment of the present invention;

FIG. 10 illustrates a DDS representing a PAC status on a high density optical disc in accordance with an example embodiment of the present invention;

FIG. 14 illustrates additional alternatives of a DDS on a high density optical disc in accordance with example embodiments of the present invention;

FIG. 15 illustrates other alternatives of a DDS representing a PAC status on a high density optical disc in accordance with example embodiments of the present invention;

FIG. 16 illustrates a DDS representing a PAC status on a high density optical disc in accordance with another example embodiment of the present invention;

DETAILED DESCRIPTION OF EXAMPLE EMBODIMENTS OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 1:
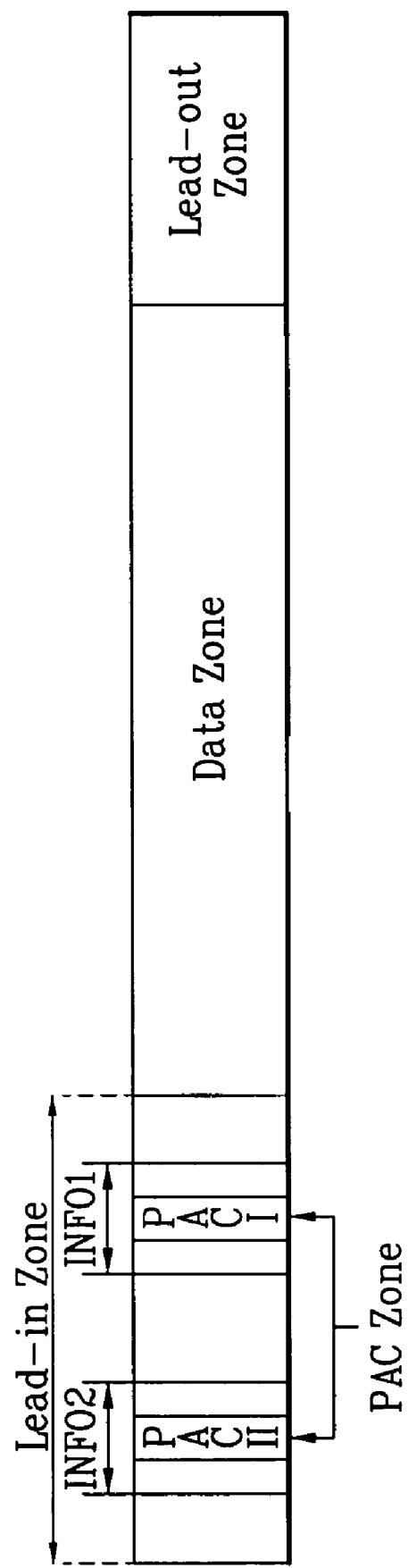
FIG. 1 illustrates PAC zones on a high density optical disc in accordance with an example embodiment of the present invention.

FIG. 1 illustrates a PAC zones on a high density optical disc in accordance with an example embodiment of the present invention.

Referring to FIG. 1, the high density optical disc may be partitioned, from an inner circumference to an outer circumference, into a lead-in zone, a data zone, and a lead-out zone. The lead-in zone may further be partitioned into an INFO2 zone and an INFO1 zone for recording various kinds of information thereon. The INFO2 zone and/or the INFO1 zone may include PAC (Physical Access Control) zones.

For convenience, a PAC zone assigned to the INFO2 zone is labeled as a PACII zone and the PAC zone assigned to the INFO1 zone is labeled a PACI zone. One of the PACII zone and the PACI zone may have an original PAC recorded thereon and the other may be a back up zone for recording a copy of the original PAC. If a writing direction is from the inner circumference to the outer circumference of the disc, it may be advantageous that the original PAC is recorded on the PACII zone and the backup PAC is recorded on the PACI zone.

The PAC zone may be provided to handle problems that may occur when an older version of a drive apparatus cannot detect functions on a disc added having functions compatible with a newer version of a drive apparatus. The PAC zone may handle compatibility problems using one or more an "unknown rules".

An "unknown rule" may be used to control predictable operations of the disc, for example, basic control of read, write, etc., linear replacement of a defective zone, logical overwrite, etc. An area may also be provided on the disc, indicating where the "unknown rule" is applicable, for example, segments for defining the entire disc or a certain portion of the disc, which is described later in more detail.

Thus, by defining an area of the disc, an older version drive apparatus is able to access by using the "unknown rule", a newer version of the disc reduces unnecessary access operation of the older version drive apparatus.

Moreover, by defining an accessible area on a physical area of the disc for an older version drive apparatus to access by using the PAC, a data area containing user data recorded thereon can be protected more robustly and/or unauthorized access (for example, hacking) of the disc may be prevented or reduced.

The INFO2 zone and the INFO1 zone having the PACII and I zones therein in the lead-in zone may be reviewed in view of writable characteristics of the high density optical disc.

Figures 2, 3:
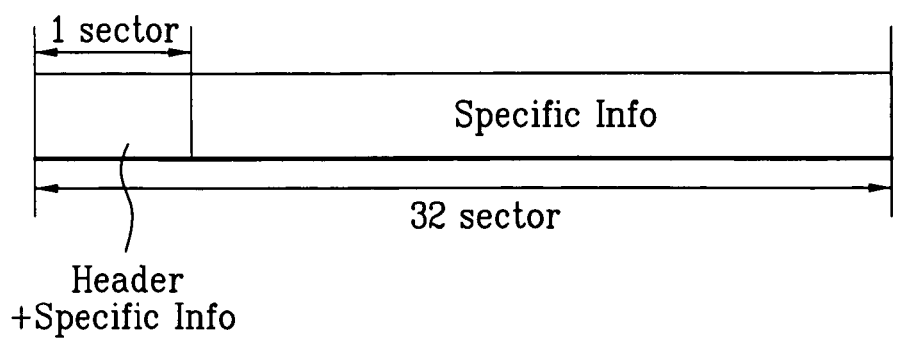
FIG. 2 illustrates a diagram showing configurations of INFO2 zone and INFO1 zone on a high density optical disc in accordance with an example embodiment of the present invention.
FIG. 3 illustrates a structure of a PAC recorded on a high density optical disc in accordance with an example embodiment of the present invention.

FIG. 2 illustrates a diagram showing configurations of the INFO2 zone and the INFO1 zone on a high density optical disc in accordance with an example embodiment of the present invention.

Referring to FIG. 2, for an example BD-RE high density optical disc, the INFO2 zone may have 256 clusters including 32 clusters of PACII zone, 32 clusters of DMA (Defect Management Area) 2 zone for management of defects, 32 clusters of CD (Control Data) 2 zone having control information recorded thereon, and/or 32 clusters of BZ (Buffer Zone) 3 zone of a buffer zone.

The INFO1 zone may include 32 clusters of BZ2 zone of a buffer area, 32 clusters of drive area which may be a drive area for storing information specific to a drive, 32 clusters of DMA1 zone for managing defects, 32 clusters of CD1 zone for recording control information, and/or a BZ1-PACI zone utilizable as the PAC zone.

For a write once high density optical disc (BD-R), the INFO2 zone may have 256 clusters including a PACII zone, a DMA 2 zone, a CD 2 zone, and a BZ 3 zone, each with 32 clusters, and the INFO1 zone includes a BZ2 zone, a DMA1 zone, a CD1 zone, and/or a BZ1-PACI zone, each with 32 clusters, and 128 clusters of drive area.

For a read only high density optical disc (BD-ROM), a PAC may be a primary PAC and the INFO2 zone may have 256 clusters including a PACII zone, a CD 2 zone, and a BZ 3 zone, each with 32 clusters, and the INFO1 zone 256 clusters including a CD1 zone, and/or a BZ1-PACI zone, each with 32 clusters.

The PAC zones of example embodiments of the present invention may be assigned to the INFO2 zone and/or the INFO1 zone in the lead-in zone in 32 clusters each, according to rewritable characteristics of the high density optical disc.

In the PAC zone of 32 clusters, one PAC may have one cluster, for recording a plurality of valid PACs. An example structure in which one PAC is recorded as one cluster is described with reference to FIG. 3.

FIG. 3 illustrates a PAC recorded on a high density optical disc in accordance with an example embodiment of the present invention.

Referring to FIG. 3, one PAC of one cluster size (32 sectors) may include a header zone and a specific information zone, specific to a particular disc drive (for example, optical disc drive).

The PAC header zone may have 384 bytes allocated to a first sector of the PAC, for recording various kinds of PAC information, such as information on an "unknown PAC rule" and segments, and another area of the PAC zone may have information specific to the (optical) disc drive may be referred to as "known rules" recorded thereon.

An example structure of a PAC recorded in above structure is described with reference to FIG. 4. For convenience, in the description, particular fields of the PAC that require more detailed description will refer to drawings that illustrate the particular fields.

FIG. 4 illustrates a PAC on a high density optical disc in accordance with an example embodiment of the present invention.

Referring to FIG. 4, the PAC may include a header portion applicable to all PACs and an area having information specific to the drive, recorded thereon.

An example header portion may include 4 bytes of "PAC_ID", 4 bytes of "Unknown PAC Rules", 1 byte of "Entire Disc Flag", 1 byte of "Number of Segments", and/or 32 "segments Segment_0~Segment_31 each with 8 bytes.

The "PAC_ID" may provide the present PAC status and identification codes, for example, if the "PAC_ID" contains '00 00 00 00' bits, the "PAC_ID" indicates that the present PAC is not used, if the "PAC_ID" contains 'FF FF FF FE' bits, the "PAC_ID" indicates that the present PAC zone is not available for use due to defects or something similar, and if the "PAC_ID" contains 'FF FF FF FF' bits, the "PAC_ID" indicates that the present PAC zone is available for use again even if the PAC zone has been used previously.

By recording the "PAC_ID" in predetermined bits, such as '54 53 54 00' bits, the "PAC_ID" may be used as a code for determining if the disc is a disc for which a present drive can have free access to. That is, if the present drive does not recognize the "PAC_ID" applied thereto (possibly a case where the present drive can not recognize the present PAC due to version mismatch or similar problem), the '54 53 54 00' bits may be used as code to refer to information recorded in the "Unknown PAC Rules" field.

As described, the "Unknown PAC Rules" field may be used as a field that designates an operation range of a drive that can not recognize the present PAC, which will be described further with reference to FIG. 5.

FIG. 5 illustrates an "Unknown PAC Rules" field in accordance with an example embodiment of the present invention.

Referring to FIG. 5, a degree of controllability of various areas on the disc may be enabled by the "Unknown PAC Rules". In this example, the "Area" column in FIG. 5 represents the controllable areas on the disc, the "Control" column represents control types, such as read/write etc., and "Number of bits" column represents a number of bits required for control. The additional bits in the "Number of bits" column may represent cases of dual layer disc with two recording/reproduction sides.

For example, in the "Area" column in FIG. 5, read/write controllability of the PAC zone can be represented with "PAC zones 1, 2" fields, and write controllability of a defect management zone can be represented with "DMA Zone 1, 2" fields. Write controllability of a replacement area for a defective area can be represented with "Replacement Clusters" field, read/write controllability of a data zone can be represent with a "Data Zone" field, and logical overwrite controllability can be represented with a "Logical Overwrite" field.

Write controllability is applicable only to re-writable discs BD-RE and BD-R and the write controllability of a replacement area for a defective area is also applicable to the re-writable discs BD-RE and BD-R. As a result, various example features of the present invention may depend on the re-writable characteristics of the high density (optical) disc.

Using the above technique, the "Unknown PAC Rules" field enables designation of a controllable area on the disc for a drive with a version mismatch. Moreover, the above technique may also be applicable to control access to a particular physical area on a disc at a user's option.

Returning to FIG. 4, the "Entire Disc Flag" field may be used as a field for indicating that the PAC is applicable to an entire area of the disc and the "Number of Segments" field is a field that may represent a number of segment areas to which the PAC is applicable.

In an example embodiment, a maximum number of segments may be allocatable to one PAC. In an example embodiment, a maximum number of 32 segments can be allocated to one PAC and information on the allocated segments may be written in "Segment_0" to "Segment_31" fields, each including 8 bytes. Each of the "Segment_0~31" fields may include the first physical sector number (PSN) and the last PSN of the allocated segment area recorded thereon.

Figure 6:
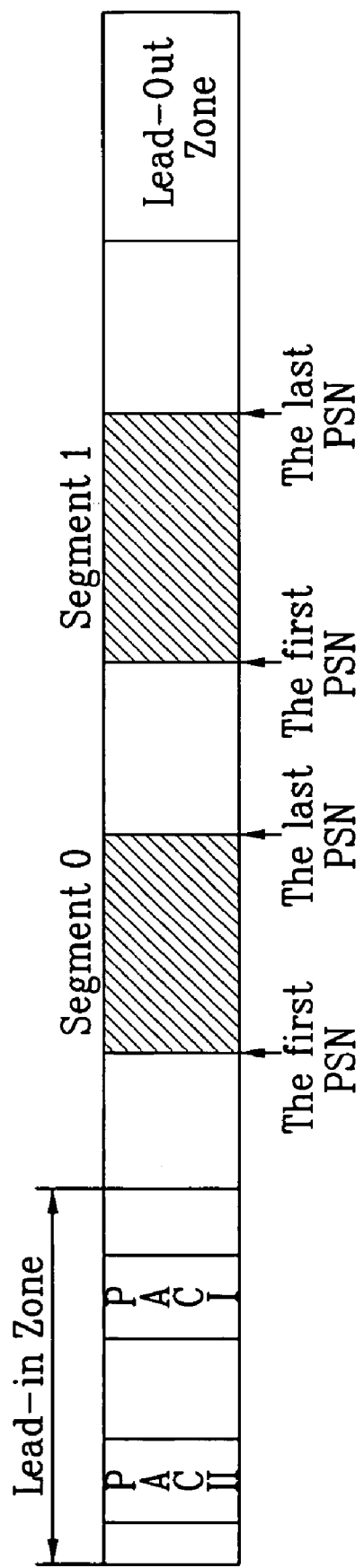
FIG. 6 illustrates segment zones on a high density optical disc in accordance with an example embodiment of the present invention.

Segments are described in more detail below. FIG. 6 illustrates segment zones on a high density optical disc in accordance with an example embodiment of the present invention.

Referring to FIG. 6, if required, there may be a maximum number (for example, 32) of segment areas on the high density optical disc, for applying the PAC thereto. The maximum number of segment area may start from "segment 0".

In an example, positions of the segment areas may be identified by an optical disc drive by writing the first PSN, which may indicate a starting position of the allocated segment area and the last PSN which may indicate the last position of the allocated segment area on "Segment" fields of PACII and PACI zones.

In an example arrangement, none of the plurality of allocated segments need overlap and the starting and ending positions may be designated at boundaries of clusters.

Thus, in example embodiments, the present invention may provide a plurality of PACs, to manage a number (for example, 32) segment areas, which are described in more detail below.

Figure 7:
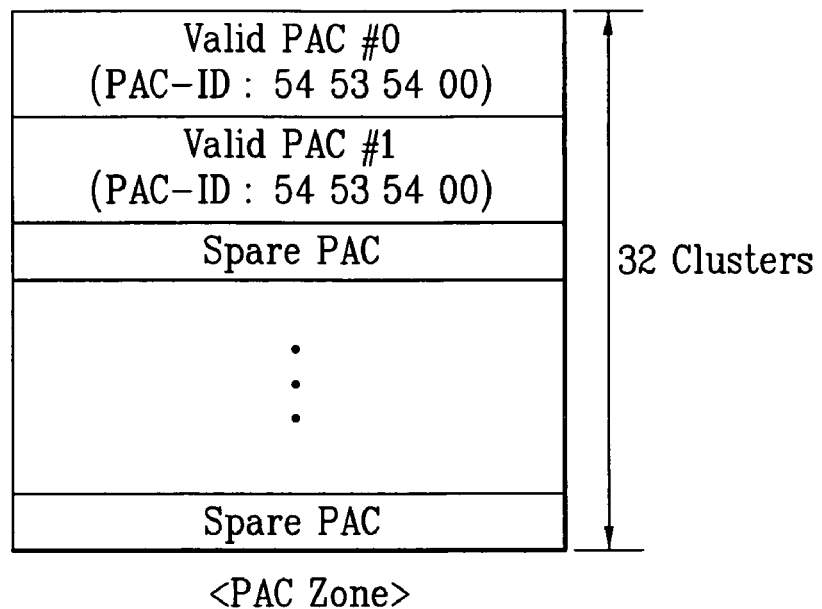
FIG. 7 illustrates a PAC zone on a high density optical disc in accordance with an example embodiment of the present invention.

FIG. 7 illustrates a PAC zone on a high density optical disc in accordance with an example embodiment of the present invention.

Referring to FIG. 7, a plurality of valid PACs, each with a common cluster size, may be written in one PAC zone (for example, the PAC zone of INFO2 or INFO1) of 32 clusters.

A valid PAC may represent a zone having various kinds of PAC information described above, and including copies, may include a maximum (for example, 16) valid PACs, each with a common size, which can be allocated to one PAC zone.

A valid PAC may have a predetermined PAC_ID (for an example, PACID=54 53 54 00) according to a drive version of the optical disc having the PAC recorded thereon, and a PAC zone not used may be a spare PAC zone. The spare PAC zone may be filled with 00 bits (PAC_ID=00 00 00 00) indicating that the zone is not used or may be left as a "not used area", depending on a setting of the optical disc drive.

Because only one write is physically possible in the case of a write-once high density optical disc BD-R, in an example, nothing is written in the spare area until writing is completed or until the disc is closed (no additional writing is desired by the user).

Because physical repetitive overwrite is possible in the case of a re-writable high density optical disc BD-RE, in an example, even if the valid PACs and Copy PACs thereof are written in the PAC zone of 32 clusters, a number of writing times in acceptable.

If a defect is present in one PAC zone in the PAC to be written therein, the PAC may be written in an area next to the defective area. A defect may be a result of damage to, or contamination of a disc surface, and when the defect occurs in the area the PAC is to be written, the PAC information may be written in an area next to the defective area.

The plurality of valid PACs which can be allocated to the PAC zone may have various kinds of information regarding controllable areas of the disc, which are described with reference to FIG. 8.

Figure 8:
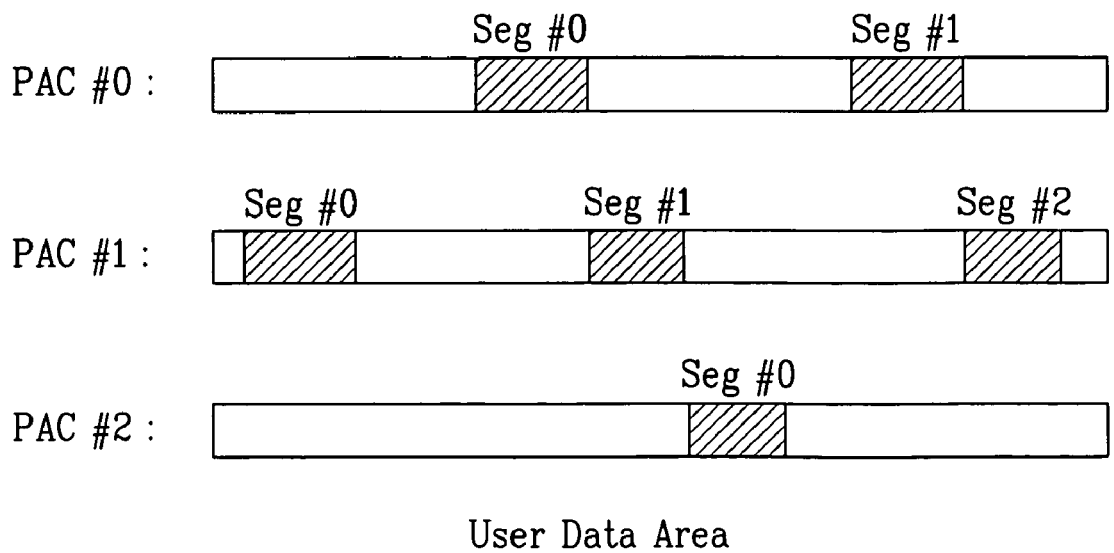
FIG. 8 illustrates segment zones managed by a plurality of PAC zones on a high density optical disc in accordance with an example embodiment of the present invention.

FIG. 8 illustrates segment zones managed by a plurality of PAC zones on a high density optical disc in accordance with an example embodiment of the present invention.

Referring to FIG. 8, for drives of different versions, controllable segment areas may be designated on the disc by using the plurality of PACs. That is, it is possible to control a segment 0 Seg #0, and segment 1 Seg #1 via PAC #0 on the disc, a segment 0 Seg #0, segment 1 Seg #1, and segment 2 Seg #2 on the disc via PAC #1, and segment 0 Seg #0 on the disc via PAC #2.

In this example, none of the segments areas controllable by respective PACs overlap and the segments areas are reordered in an ascending order starting from segment #0, which indicates that the PACs may be independent from each other.

Moreover, even though one PAC may have a maximum of 32 segment areas, a total number of the segments managed by the plurality of PACs may also not exceed 32, even in an example where the segments are managed by a plurality of PACs.

Finding a position of the valid PAC zone from the PAC zone or quick finding of a position of a next writable PAC zone, while avoiding an area written already to or a defective area from above PAC zone, may affect initialization and/or recording speed of the disc. In particular, many retries may be executed to attempt to read a defective area.

In example embodiments, the present invention provides a method in which various status information on positions of the plurality of valid PACs, a position of the next writable PAC, and/or other relevant information is written, for example, in a data structure, such as a Disc Definition Structure (DDS).

A DDS may be a zone containing information on a first PSN of a defect list, a position of a user data zone, sizes of spare areas, and/or other relevant information, and may be information written in the DMA zone of the disc as information in a Defect Management Structure (DMS) together with a Defect List (DFL).

The information written in the DMA may be information scanned and pre-loaded in advance when the disc is loaded into a drive. Therefore, once various status information on the PAC, such as positions of the plurality of valid PACs, a position of the next writable PAC, and/or other relevant information is written in the DDS as pointers, the optical disc drive may obtain information on the PAC zone without needing to scan all the PAC zones.

A DDS may include various kinds of information on status of the PAC zone and will be described below.

FIG. 9 illustrates a DDS on a high density optical disc in accordance with an example embodiment of the present invention.

Referring to FIG. 9, the DDS may include a "DDS identifier" field, a "DDS format" field, a "First PSN of Drive Area (P_DA)" field representing the first physical sector number of a drive area, a "First PSN of Defect List (P_DFL)" field representing the first PSN of the defect list, a "Location of LSN 0 of User Data Area" field representing a position of an LSN (logical sector number) of the user data area, an "Inner Spare Area 0 size (ISA0_size)" field representing a size of an inner spare area 0, an "Outer Spare Area size (OSA_size)" field representing a size of an outer spare area 0, an "Inner Spare Area 1 size (ISA1_size)" field representing a size of an inner spare area 1, a PAC Clusters Defect Status" field representing a defect status of the PAC zone, and/or a "PAC Allocated Space" field representing a designated status of the PAC zone.

Thus, an example DDS may provide various kinds of status information on the PAC, such as a position of defective cluster in the PAC zone and/or a position of clusters having valid PAC allocated thereto by using the "PAC Clusters Defect Status" field and/or the "PAC Allocated Space" field.

A method of representing PAC status information using the "PAC Clusters Defect Status" field and/or the "PAC Allocated Space" field will be described in more detail below.

FIG. 10 illustrates a diagram showing a DDS representing a PAC status on a high density optical disc in accordance with an example embodiment of the present invention.

Referring to FIG. 10, two bytes may be allocated to the "PAC Clusters Defect Status" field of the DDS, for representing a writing failure due to a cluster defect of the PAC zone or a defective cluster area.

As shown, a PDS N (PAC Defect Status) bit in FIG. 10 is a bit for indicating the status of the PAC clusters, wherein a 0 bit may indicate the PAC cluster N is not a defective area and a 1 bit may indicate the PAC cluster N is a defective area.

The PDS 0 bit may indicate a status of the PAC #0 zone, the PDS 1 bit may indicate a status of the PAC #1 zone, and so on, up to PDS 15 bit (for example, for 16) for indicating status of valid PACs, which can be allocated to one PAC zone.

Two bytes may also allocated to the "PAC Allocated Space" field of the DDS zone, for indicating an allocation status of the PAC zone.

The PSB N (PAC Status Bit) in FIG. 10 may be a bit indicating the allocation status of the PAC clusters, wherein a 0 bit may indicate a status in which the PAC cluster N can be newly allocated, for example, the PAC is not used or PAC_ID=00000000 or FFFFFFFF state and a 1 bit may indicate a status in which the PAC cluster N is allocated.

In this example, like the PDS bits, the PSB bits may be allocated from a PSB 0 bit to a PSB 15 bit, such that the PSB 0 bit indicates PAC #0 zone, PSB 1 bit indicates PAC #1 zone, etc.

Various example embodiments in which a status of the PAC zone is represented using a DDS, for example, as described, will be discussed below.

Figure 11:
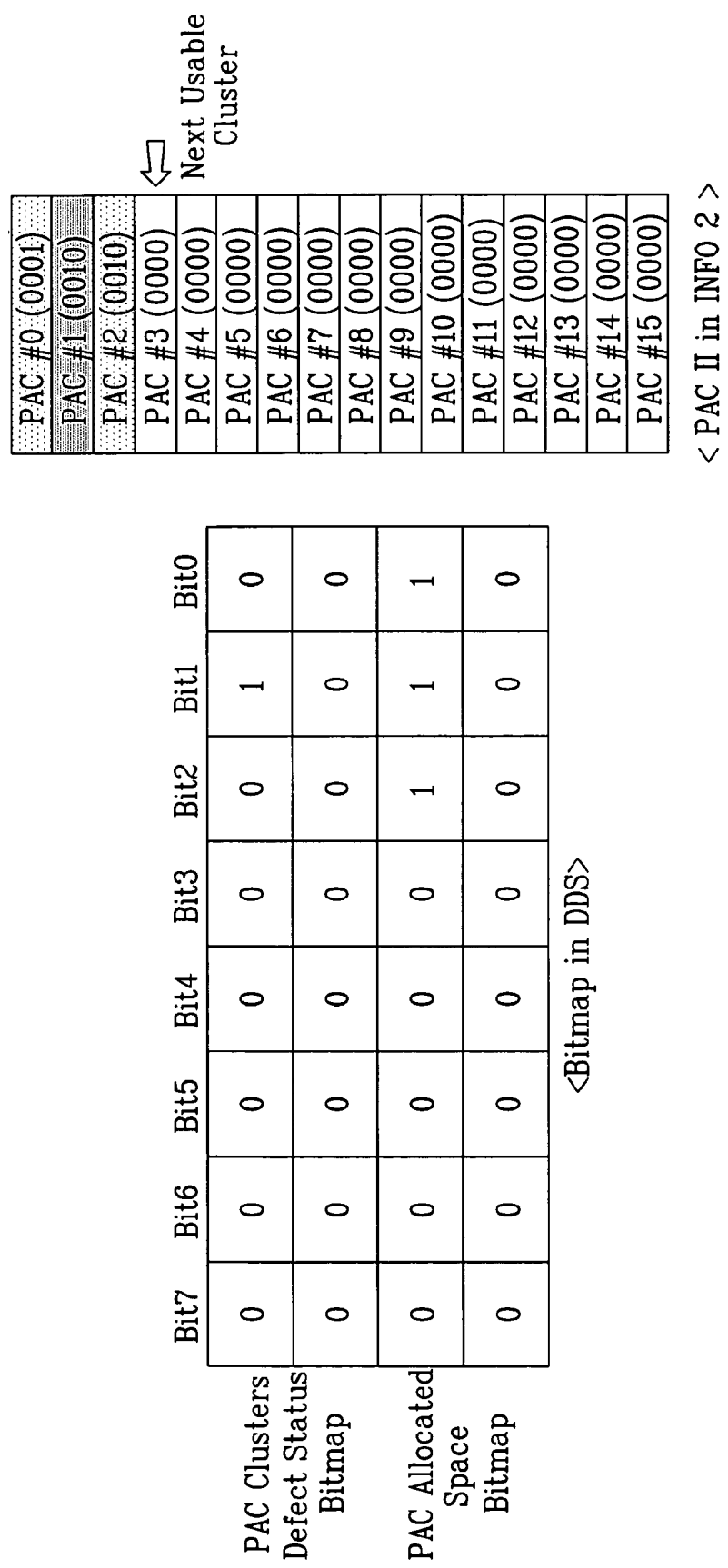
FIGS. 11 to 13 illustrate diagrams showing several alternatives of a DDS, each representing a PAC status on a high density optical disc in accordance with an example embodiment of the present invention.
Figure 12:
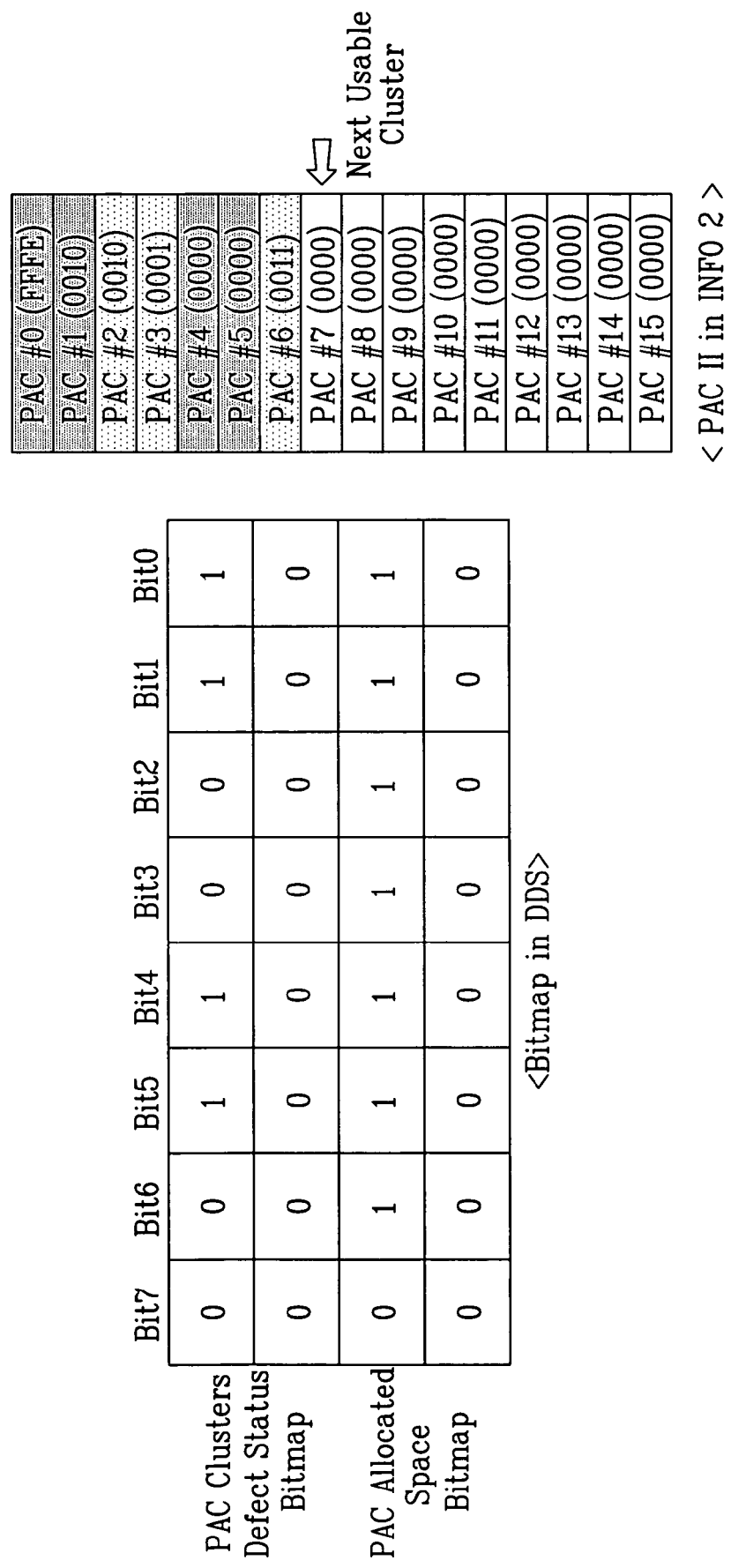
Figure 13:
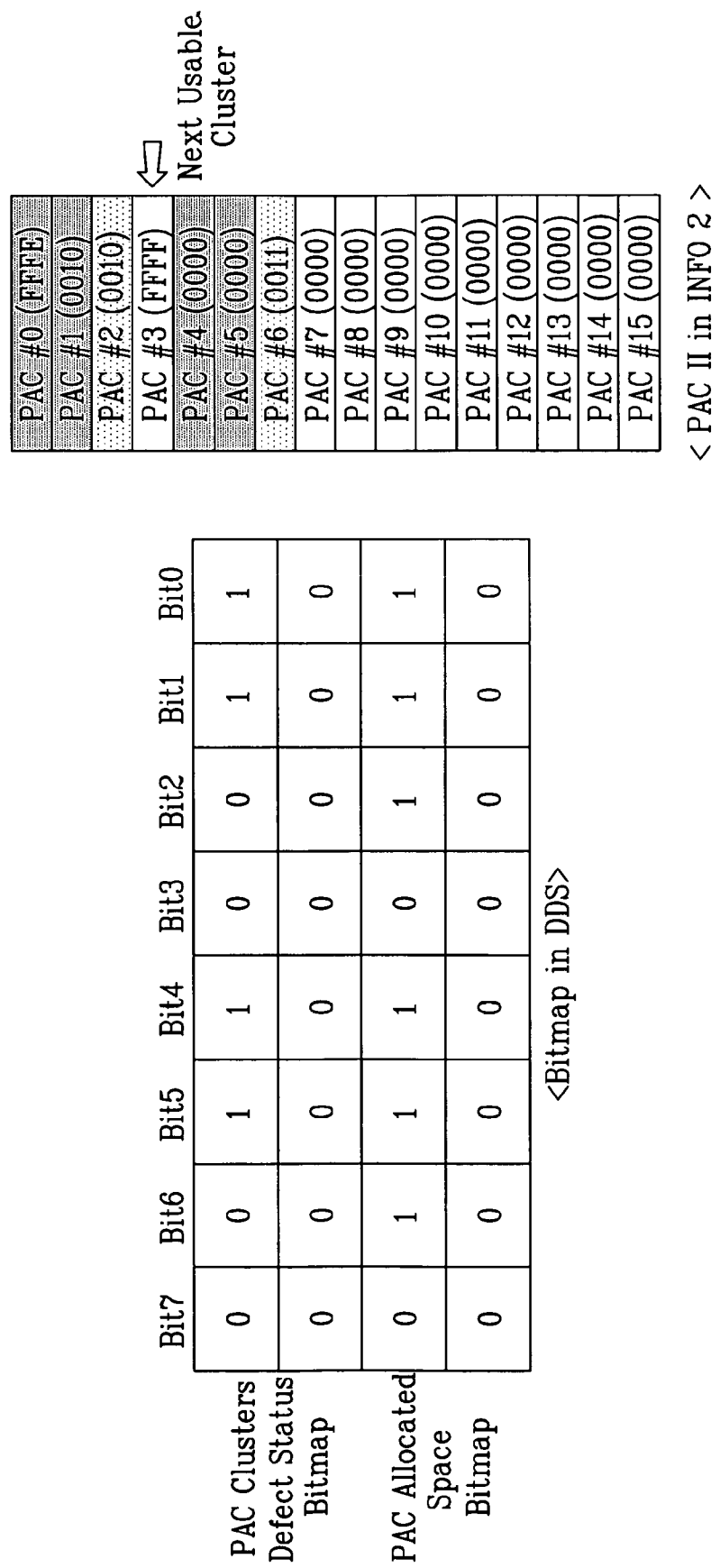

FIGS. 11 to 13 illustrate diagrams showing various example embodiments of a DDS, each representing a PAC status on a high density optical disc in accordance with an example embodiment of the present invention.

Referring to FIG. 11, the PDS 1 bit is 1 on a bitmap of the "PAC Clusters Defect Status" field, which is information on a defective area of the PAC zone in the information contained in the DDS. Accordingly, an optical disc drive may be made aware that the PAC #1 zone is defective based on the information.

Also, each of PSB 0, PSB 1, and PSB 2 bits is also 1 on a bitmap of the "PAC Allocated Space" field indicating an allocation status of the PAC zone, and an optical disc drive may be made aware that the PAC #0, PAC #1, and PAC #2 zones are in allocated states based on the above information. Therefore, the next available PAC zone that is not defective area and not an allocated area, is PAC #3 zone.

Also, referring to FIG. 12, because each of the PDS 0, PDS 1, PDS 4, and PDS 5 bits is 1 on the bitmap of the "PAC Clusters Defect Status" field, an optical disc drive may be made aware that each of the PAC #0, PAC #1, PAC #4, and PAC #5 zones is a defective area, and because each the PSB 0, PSB 1, PSB 2, PSB 3, PSB 4, PSB 5, and PSB 6 bits is 1 on the bitmap of the "PAC Allocated Space" field, an optical disc drive may be made aware that each of the PAC #0, PAC #1, PAC #2, PAC #3, PAC #4, PAC #5, and PAC #6 zones is in an allocated status. Therefore, in the case of FIG. 12, the next available PAC zone is PAC #7.

Also, referring to FIG. 13, because each of the PDS 0, PDS 1, PDS 4, and PDS 5 bits is 1 on the bitmap of the "PAC Clusters Defect Status" field, an optical disc drive may be made aware that each of the PAC #0, PAC #1, PAC #4, and PAC #5 zones is a defective area, and because each of the PSB 0, PSB 1, PSB 2, PSB 4, PSB 5, and PSB 6 bits is 1 on the bitmap of the "PAC Allocated Space" field, an optical disc drive may be made aware that each of the PAC #0, PAC #1, PAC #2, PAC #4, PAC #5, and PAC #6 zones is in an allocated status.

Therefore, in the case of FIG. 13, the next available PAC zone is PAC #3, which may be an area which is presently re-usable, even if the PAC #3 area was used previously.

As set forth above, a copy of information on the PAC II zone of the INFO 2 zone, may be recorded on an area of the PAC I zone of the INFO 1 zone corresponding to an area of the PAC II zone of the INFO 2 zone. If the PAC #1 zone of the PAC II zone is defective, the PAC I zone of the PAC #1 zone may be used (if not defective).

It is also possible that the DDS is made to include, not only the information on the 4 bytes of PAC II zone, but also information on the PAC I zone by allocating additional (for example, 4) bytes to the DDS. In this case, the information written on the PAC I will be free from the defective area of the PAC II zone.

FIG. 14 illustrates a diagram showing another embodiment of a DDS on a high density optical disc in accordance with another example embodiment of the present invention.

Referring to FIG. 14, as described above, the DDS may include a "DDS identifier" field, a "DDS format" field, a "First PSN of Drive Area (P_DA)" field, a "First PSN of Defect List (P_DFL)" field, a "Location of LSN 0 of User Data Area" field, an "Inner Spare Area 0 size (ISA0_size)" field, an "Outer Spare Area size (OSA_size)" field, and an "Inner Spare Area 1 size (ISA1_size)" field, and/or a "PAC Status" field representing a status of the PAC zone.

The "PAC Status" field may have 8 bytes, for representing status of the PACs in the PAC II zone of the INFO 2 zone and the PAC I zone of the INFO 1 zone, which will be described in detail below.

FIG. 15 illustrates a diagram showing another embodiment of a DDS representing a PAC status on a high density optical disc in accordance with another example embodiment of the present invention.

Referring to FIG. 15, the "PAC Status" field of the DDS may use 64 bits (8 bytes) in total for representing status of PACs in PAC II zone of the INFO 2 zone and PAC I zone of the INFO 1 zone.

In this example, information in one PAC may be represented with two bits, for example, by allocating bits b1 and b0 to indicate a status of the PAC #0 of the PAC I zone, and bits b2 and b3 to indicate a status of the PAC #2 of the PAC I zone, and every subsequent two bits indicating a PAC status of the PAC zone in succession. Accordingly, bits b31 and b30 may represent the PAC #15 status of the PAC I zone, bits b33 and b32 may indicate the PAC #0 status of the PAC 2 zone, and bits b63 and b62 may indicate the PAC #15 status of the PAC 2 zone.

The PAC status of the PAC zone represented with two bits may indicate that the PAC is unrecorded when the two bits are 00, the PAC is written in 00 00 00 00 bits to indicate that the PAC is writable or in FF FF FF FF bits to indicate that the PAC is re-usable even if the PAC has been used before when the two bits are 01, the PAC is a defective area FF FF FF FE when the two bits are 10, and the PAC is a valid PAC (for example, Valid PAC=54 53 54 00) when the two bits are 11.

Therefore, the next writable PAC zone is an area with bits 00 or bits 01, and a position of the valid PAC will be an area with bits 11.

By using the above method, the optical disc drive may obtain information on a position of the valid PAC, a position of a defective area, a next writable position, and/or other relevant information on the PACs written in the PAC 2 zone and the PAC 1 zone from the 8 bytes of "PAC Status" field inserted in the DDS zone.

FIG. 16 illustrates a DDS representing a PAC status on a high density optical disc in accordance with another example embodiment of the present invention.

If a bitmap of the "PAC Status" field of the DDS is the same as illustrated in FIG. 16, since the b33 and b32 bits indicating the PAC #0 in the PAC II zone is 11, it is known that the PAC #0 in the PAC II zone is a valid PAC.

Also, since the b35 and b34 bits indicating the PAC #1 in the PAC II zone are 10, it is known that the PAC #1 in the PAC II zone is a defective area, and since the b37 and b36 bits indicating the PAC #2 in the PAC II zone are 01, it is known that the PAC #2 in the PAC II zone is an area used previously, or if 00, usable presently.

Accordingly, if it is intended to find the position of the valid PAC, the optical disc drive may find the PAC with the bits 11 of the "PAC Status" field information of the DDS indicates, and when it is intended to find the position of a next writable PAC zone, the optical disc drive may find bits 01 or 00 in the "PAC Status" information.

Moreover, a back up of the PAC information in the PACII zone may be written on the PACI zone, even though the bitmap indicating the PACII zone of the "PAC Status" field and the bitmap indicating the PACI zone are identical, if positions of the defective areas and/or other similar areas are not identical, the two bitmaps may not be identical. Therefore, if it is intended to read information written on the PACI zone due to an unavoidable situation, it may be necessary to refer to information indicating the PACI zone from the "PAC Status" field information of the DDS.

Other than the example method for representing the PAC status of the PACII zone and the PACI zone with 8 bytes in the DDS, there are also other example methods for representing only the PAC status of the PACII zone with only four bytes. This is, as described above, because information written on the PACII zone and the information written on the PACI zone is identical, and, in this instance, if it is desired to know the PAC status of the PACI zone, the PACI zone can be determined from a position of the PACII zone corresponding to the PACI zone.

In this example, if writing of the PAC information on the PACI zone corresponding to a position of the PACII zone fails due to defective area or other similar circumstance in the PACII or PACI zone, a method of not using the area may be employed.

Information representing positions of a plurality of valid PACs with the DDS like the example embodiments of the present invention may be favorable for a writable disc BD-RE, or R in which information is updated by successive writing.

For example, in the case of a write once high density optical disc BD-R, in which positions of the plurality of valid PACs are changed whenever writing is repeated after ejection due to the physical characteristics of the write once disk, the position information may be written on a Temporary Disc Management Area (TDMA) as a Temporary Disc Definition Structure (TDDS) information and written as DDS information at the time of completion of disc writing or disc closing, when no more writing is desired by the user.

Figure 17:
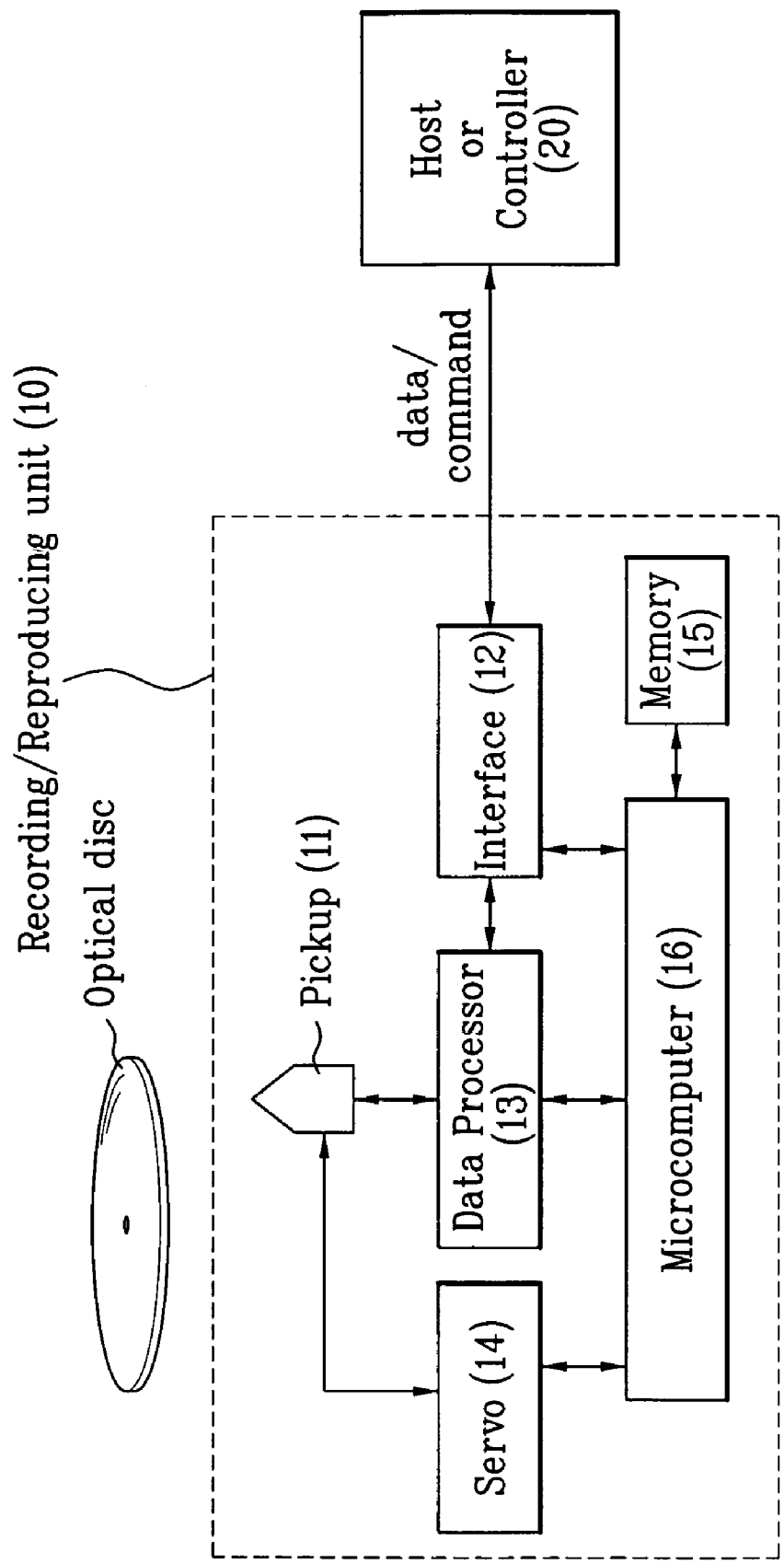
FIG. 17 illustrates a block diagram of an optical recording/reproducing apparatus in accordance with an example embodiment of the present invention.

FIG. 17 illustrates a block diagram of an optical recording/reproducing apparatus in accordance with an example embodiment of the present invention.

Referring to FIG. 17, the optical recording/reproducing apparatus may include a recording/reproducing device 10 for performing recording to and/or reproduction from the optical disc, and a host, or controller 20 for controlling the recording/reproducing device 10. In an example embodiment, the recording/reproducing device 10 may act as the "optical disc drive" discussed above in conjunction with many example embodiments of the present invention.

In an example embodiment, the host 20 gives a writing or reproduction instruction to write to or reproduce from a particular area of the optical disc to the recording/reproducing device 10, and the recording/reproducing device 10 performs the recording/reproduction to/from the particular area in response to the instruction from the host 20.

The recording/reproducing device 10 may further include an interface part 12 for performing communication, such as exchange of data and instructions with the host 20, a pickup part 11 for writing/reading a data to/from the optical disc directly, a data processor 13 for receiving a signal from the pickup part 11 and recovering a desired signal value or modulating a signal to be written into a signal able to be written on the optical disc, a servo part 14 for controlling the pickup part 11 to read a signal from the optical disc accurately or to write a signal on the optical disc accurately, a memory 15 for temporary storage of various kinds of information including management information and data, and a microcomputer 16 for controlling various parts of the recording/reproducing device 10.

An example method for recording a PAC on a high density writable optical disc using the example optical recording/reproducing apparatus will be described below.

Upon inserting the optical disc into the optical recording/reproducing apparatus, management information may be read from the optical disc and stored in the memory 15 of the recording/reproducing device 10, for use at the time of recording/reproduction of the optical disc.

In this state, if the user desires to write on a particular area of the optical disc, the host 20, taking this as a writing instruction, provides information on a desired writing position to the recording/reproducing device 10, together with a data to be written.

The microcomputer 16 in the recording/reproducing device 10 may receive the writing instruction, determine if the area of the optical disc the host 20 desires to write is a defective area or not from the management information stored in the memory 15, and/or perform data writing according to the writing instruction from the host 20 on an area which is not a defective area.

If it is determined that writing on an entire disc or on a particular area of the disc includes new features which a previous version of the recording/reproducing device is not provided with, leading the previous version of the recording/reproducing device to fail to sense, or if it is intended to restrict functions, such as writing or reproducing to/from a particular area of the disc according to restriction set by the user, the microcomputer 16 of the recording/reproducing device 10 may write control information of the area in the PAC zone on the disc as an "Unknown PAC rule". The microcomputer 16 of the recording/reproducing device 10 may also write PAC information, such as the PAC_ID for a written state, and segment information which is control information on the particular area of the disc.

The PAC information may be written as a plurality of valid PACs on the PAC 2 zone of the INFO 2 zone at one cluster size and the plurality of valid PACs may be written on the PAC1 zone of the INFO 1 zone as a backup. In this example, position information of the plurality of valid PACs may be written on the DDS in the DMA of the optical disc by a method in accordance with example embodiments of the present invention.

In particular, the microcomputer 16 may provide position information on the area the data is written thereon or the PAC zone, and the data to the servo 14 and the data processor 13, so that the writing is finished at a desired position on the optical disc via the pickup part 11.

Additionally, a method for recording/reproducing the high density optical disc having PAC information written by the above example method will be described below.

Figure 18:
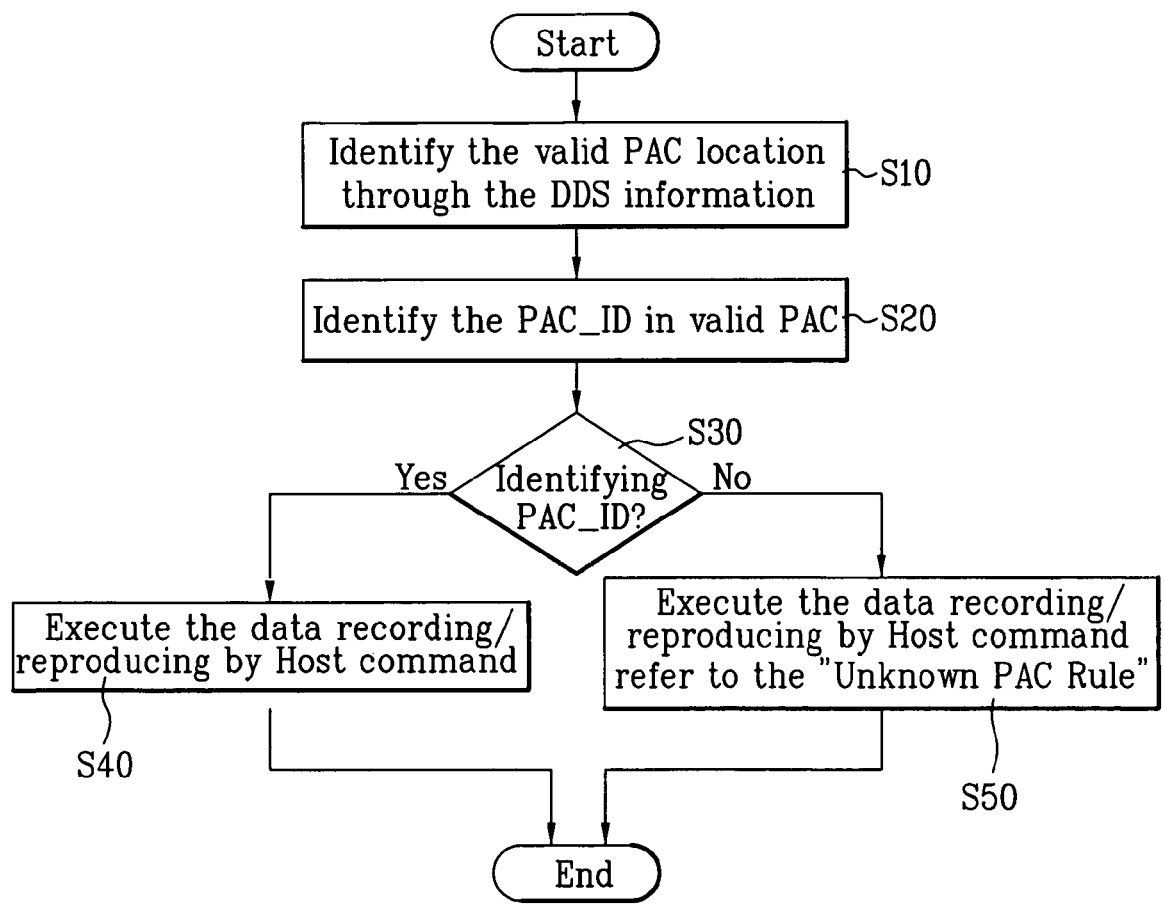
FIG. 18 illustrates a flow chart showing a method for recording to and/or reproducing from a high density optical disc having PAC recorded thereon in accordance with an example embodiment of the present invention.

FIG. 18 illustrates a flowchart showing a method for recording/reproducing a high density optical disc having PAC recorded thereon in accordance with an example embodiment of the present invention.

Upon inserting an optical disc into the optical recording/reproducing apparatus, management information may be read from the optical disc and stored in the memory 15 of the recording and reproducing device 10, for use at the time of recording and reproduction of the optical disc.

The information in the memory 10 may include position information of various zones in the PAC zone on the disc. Particularly, positions of valid PACs in the PAC zone can be determined from the DDS information (S10).

After positions of the valid PACs are determined, a PAC_ID field of the PAC may be examined, to verify if the PAC_ID is an identified PAC_ID (S20 and S30).

If the written PAC_ID is identified, the method may determine that the recording and reproducing device having written the data on the disc is identical in version to a version of the present recording and reproducing device or determine there is no separate writing/reproduction restrictions, and the recording/reproduction may be executed according to the instruction from the host 20 (S40).

If identifying a code written on the PAC_ID fails, the method may then determine if there are restrictions, such as the recording and reproducing device having written the data on the disc has a version different from a version of the present recording and reproducing device, the recording/reproduction may be executed according to the instruction from the host with reference to recording/reproduction restriction areas on the disc written on the "Unknown PAC rule" (S50).

For this, the microcomputer 16 may provide the position information and data according to the instruction of the host to the servo 14 and the data-processor 13, so that the recording/reproduction is finished at a desired position on the optical disc via the pickup part 11.

As has been described, the apparatus and method for recording/reproduction to/from a high density optical disc of the present invention may have one or more of the following advantages.

First, the definition of an accessible area of a disc of a different version drive by using PACs may permit more robust protection of a data area having user data recorded thereon, for example, to prevent or reduce unauthorized access (for example, hacking).

Second, a plurality of valid PACs on the disc and/or pointers indicating positions of the PACs may permit more effective management of the PACs on the high density optical disc.

Third, apparatus and method for recording/reproducing data using PACs may permit more effective data recording/reproduction on a high density optical disc.

It will be apparent to those skilled in the art that various modifications and variations can be made to the example embodiments of the present invention described above without departing from the spirit or scope of the invention. Thus, it is intended that the present invention covers the modifications and variations of this invention provided they come within the scope of the appended claims and their equivalents.

What is claimed is:

1. A recording medium, comprising:
    at least one control data area for storing at least one access control data, the access control data including a predetermined rule for specifying one or more operations being required when the access control data is not identified by an apparatus attempting to record/reproduce data, and the access control data managing an access to the recording medium and enlarging a compatibility of the recording medium by controlling the access according to the predetermined rule; and
    at least one management area for storing status information to indicate a status of the access control data stored in the control data area, wherein the status information indicates whether the access control data is valid or not.

2. The recording medium of claim 1, wherein the recording medium is a rewritable recording medium and the one management area is a disk definition structure (DDS).

3. The recording medium of claim 2, wherein the status information includes a status bit map.

4. The recording medium of claim 3, wherein the status bit map indicates at least validity of the access control data in the control data area.

5. The recording medium of claim 3, wherein the status bit map indicates whether the access control data is unrecorded, usable or reusable, defective, or valid.

6. The recording medium of claim 1, wherein the status information includes defect status information and/or allocation status information on the access control data.

7. The recording medium of claim 6, wherein the defect status information indicates whether the access control data in the control data area is defective or not.

8. The recording medium of claim 6, wherein the allocation status information indicates whether the access control data is allocated to the control data area or not.

9. The recording medium of claim 6, wherein the allocation status information indicates whether the access control data is newly allocable to the control data area or not.

10. The recording medium of claim 1, wherein the status information is represented by at least one bit.

11. The recording medium of claim 1, wherein the recording medium is a write once recording medium and the at least one management area is a temporary disk definition structure (TDDS).

12. The recording medium of claim 1, wherein the status information indicates whether the access control data is valid, defective, allocated, newly allocable, or available for use.

13. The recording medium of claim 1, wherein the at least one control data area is in an information zone of a lead-in zone of the recording medium.

14. The recording medium of claim 1, wherein the control data area includes two control data zones, one of them includes backup copies of the access control data.

15. The recording medium of claim 14, wherein the two control data zones are respectively recorded in different information zones of a lead-in zone of the recording medium.

16. The recording medium of claim 1, wherein the at least one control data area includes
    a header, common to the at least one control data area, and
    a specific information area, including information specific to the at least one control data area.

17. The recording medium of claim 1, wherein the predetermined rules are used when a version/type of the access control data is not identified by a recording/reproducing apparatus.

18. The recording medium of claim 17, wherein the predetermined rules control an access to the recording medium to record/reproduce user data on/from the recording medium.

19. The recording medium of claim 18, wherein the predetermined rules include control information to control recording/reproducing the user data.

20. The recording medium of claim 1, further comprising:
    a backup area storing a copy of the access control information,
    wherein the control data area and the backup area are located in an inner area of the recording medium.

21. The readable medium of claim 1, wherein the access control data further includes type information indicates whether the corresponding access control data is available for re-use.

22. A method of recording data/information on a recording medium, comprising:
    recording at least one access control data, the access control data including a predetermined rule for specifying one or more operations being required when the access control data is not identified by an apparatus attempting to record/reproduce data, and the access control data managing an access to the recording medium and enlarging a compatibility of the recording medium by controlling the access according to the predetermined rule; and
    recording status information for indicating a status of the access control data, the status information indicating at least validity of the access control data.

23. The method of claim 22, wherein the status information includes whether the access control data is defective.

24. The method of claim 22, wherein the access is controlled by the predetermined rule when a version/type of the access control data is not identified.

25. The method of claim 22, further comprising:
    recording a copy of the access control information in a backup area of the recording medium,
    wherein the control data area and the backup area are located in an inner area of the recording medium.

26. A method of reproducing data from a recording medium, comprising:

reading status information for indicating a status of at least one access control data recorded on the recording medium, the status information indicating at least a validity of the access control data; and reading the at least one access control data based on the status information, the access control data including a predetermined rule for specifying one or more operations being required when the access control data is not identified by an apparatus attempting to record/reproduce data, and the access control data managing an access to the recording medium and enlarging a compatibility of the recording medium by controlling the access according to the predetermined rule.

27. The method of claim 26, further comprising:

accessing to the recording medium based on the predetermined rule included in the access control data in order to record/reproduce user data on/from the recording medium when a version/type of the access control data is not identified.

28. An apparatus for recording/reproducing data on/from a recording medium, comprising:

an optical device configured to record data on the recording medium or reproduce data from the recording medium; and a control unit configured to control the optical device to access to the recording medium based on at least one access control data and status information, the access control data including a predetermined rule for specifying one or more operations being required when the access control data is not identified by the control unit, the access control data managing an access to the recording medium and enlarging a compatibility of the recording medium by controlling the access according to the predetermined rule, the status information indicating at least validity of the access control data.

29. The apparatus of claim 28, wherein the status information includes whether the access control data is defective.

30. The apparatus of claim 28, further comprising a host device to generate a command for recording/reproducing the data to the control unit.

31. The apparatus of claim 28, wherein the control unit is configured to control the optical device to access to the recording medium based on the predetermined rule in the access control data in order to record/reproduce user data on/from the recording medium when the control unit cannot identify a version/type of the access control data.

32. The apparatus of claim 28, wherein the control unit is further configured to control the optical device to record a copy of the access control information in a backup area of the recording medium, wherein the control data area and the backup area are located in an inner area of the recording medium.

33. An apparatus for recording/reproducing data on/from a recording medium, comprising:

an optical device configured to record/reproduce data on/from the recording medium; and a control unit operably connected with the optical device and configured to control the optical device to record at least one access control data in the recording medium, the access control data including a predetermined rule for specifying one or more operations being required when the access control data is not identified by the control unit, and the access control data managing an access to the recording medium and enlarging a compatibility of the recording medium by controlling the access according to the predetermined rule, and the control unit configured to control the optical device to record status information in the recording medium, the status information indicating a status of the recorded access control data, wherein the status information indicates whether the recorded access control data is valid or not.

34. The apparatus of claim 33, wherein the control unit is further configured to control the optical device to record a copy of the access control information in a backup area of the recording medium, wherein the control data area and the backup area are located in an inner area of the recording medium.

* * * * *